Aug. 9, 1927.
C. A. WINSLOW ET AL
1,638,281
FORCE FEED LUBRICATING SYSTEM FOR HYDROCARBON ENGINES
Filed Sept. 25, 1924      3 Sheets-Sheet 1
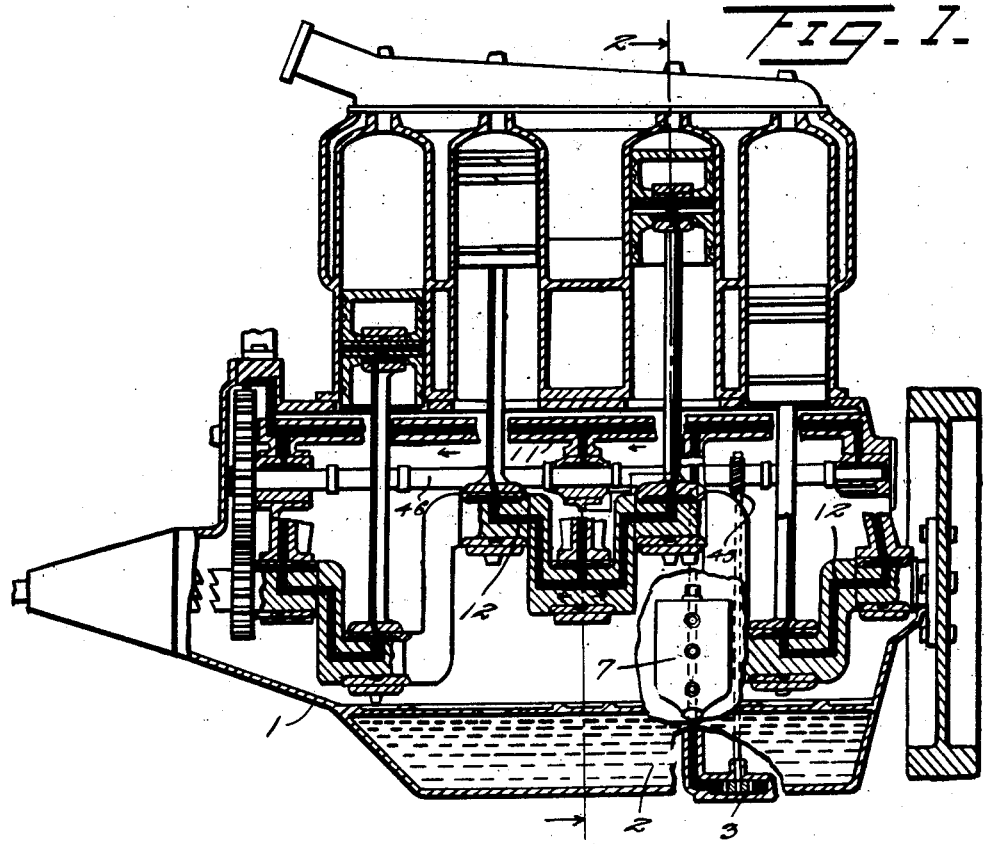
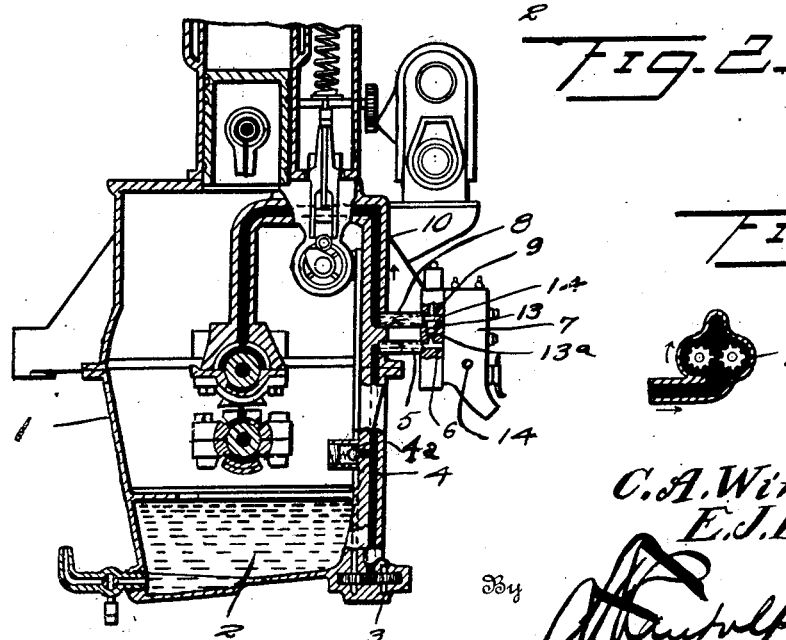
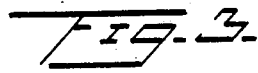
Inventor
C. A. Winslow,
E. J. Hall.
By
Attorney

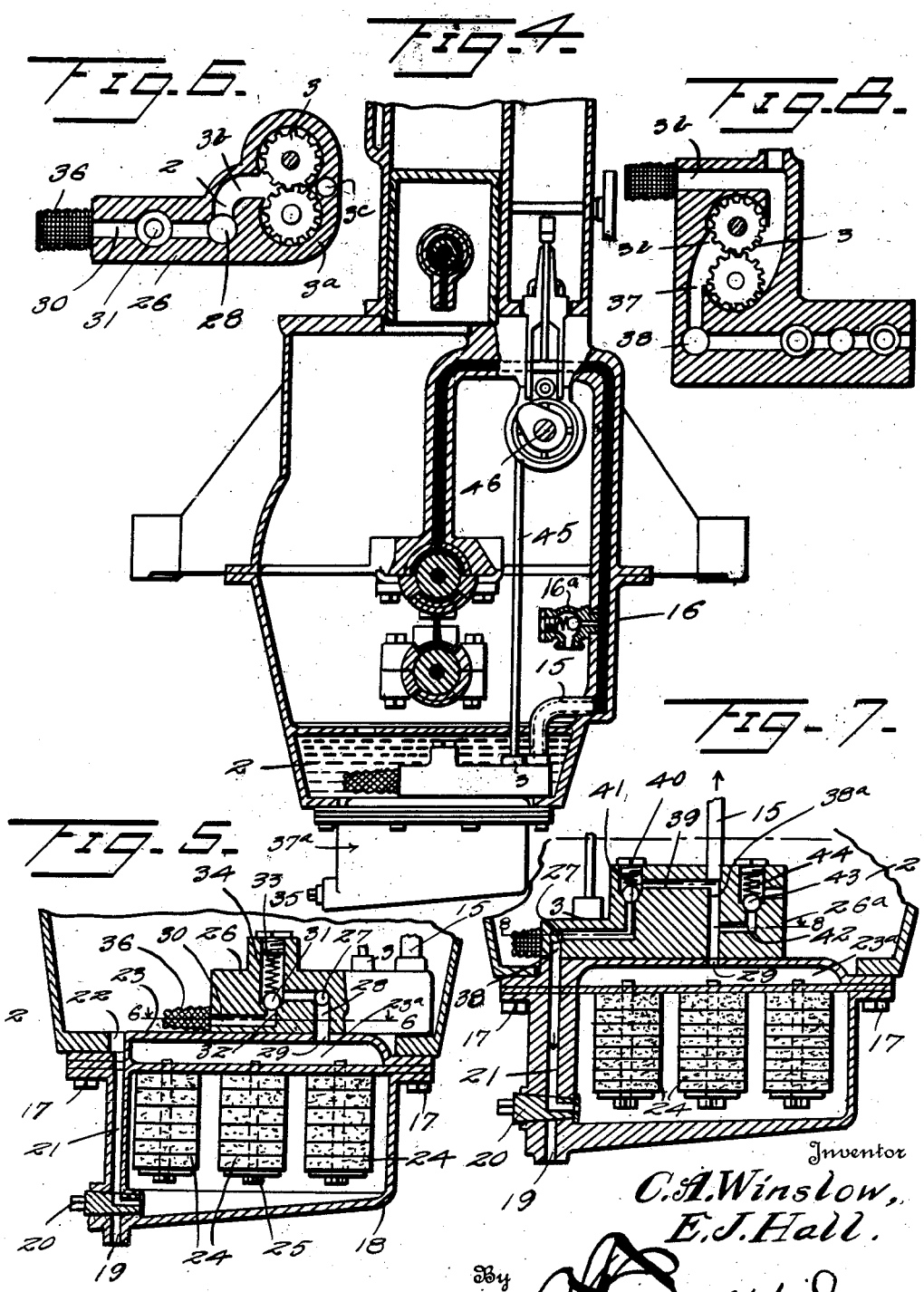

Patented Aug. 9, 1927.

1,638,281

UNITED STATES PATENT OFFICE.

CHARLES A. WINSLOW, OF VALLEJO, AND ELBERT J. HALL, OF BERKELEY, CALIFORNIA.

FORCE-FEED LUBRICATING SYSTEM FOR HYDROCARBON ENGINES.

Application filed September 25, 1924. Serial No. 739,963.

This invention relates to lubricating systems, and more particularly to force feed lubricating systems for hydrocarbon engines. It is well known that during the manufacture or repair thereof, the various parts of a hydro-carbon engine accumulate in their interstices abrasive materials such as sand, emery, metallic particles and the like, and that these abrasive materials cannot with the means now at hand be removed before the parts are assembled and the engine operated for the first time. The heating of the various parts of the engine during the initial or test operation thereof enlarges the interstices to such an extent as to enable the lubricating oil to dislodge and carry the abrasive materials to the sump of the engine, and during this and the subsequent operations of the engine, the lubricating oil also carries into the sump particles detached from the various parts of the engine as the result of wear. It is also well known that these foreign materials cannot be removed from the lubricating oil before they have been carried by the oil to and scored the bearings and other contacting surfaces of the moving parts of the engine, and this is due to the fact that the present force feed lubricating systems for hydro-carbon engines are not adapted to free the lubricating oil of foreign matter before the oil is taken from the sump and forced to the parts of the engine to be lubricated.

The invention has for one of its objects, the provision of a force feed lubricating system for hydro-carbon engines which will prevent the lubricating oil from carrying any foreign matter from the sump to the parts of the engine to be lubricated, and to attain this end a filter is so installed in the system that the lubricating oil will, from the initial or test operation of the engine until the filter becomes inoperative from any cause, such as the clogging of the filtering element, pass through the filter before reaching the parts of the engine to be lubricated.

A further object of the invention is the provision of a force feed lubricating system for hydro-carbon engines which will, in addition to freeing the oil of all foreign matter before it is delivered to the parts of the engine to be lubricated, effect a constant improvement in the lubricating qualities of the oil by removing therefrom all constituents, such as lacquer, tar and the like, that lower its lubricating efficiency.

A further object of the invention is the provision of a force feed lubricating system which will enable the lubricating oil to be brought to the temperature necessary to permit the filter to remove from the oil those constituents thereof that lower its lubricating efficiency.

A still further object of the invention is the provision of a force feed lubricating system for hydro-carbon engines which shall include means adapted to shunt the liquid by the filter should its resistance to the passage of oil therethrough increase beyond a predetermined degree, whereby to insure the supply of the proper amount of oil to the parts of the engine to be lubricated at all times.

The invention is hereinafter fully described and claimed, and illustrated in the accompanying drawings, wherein:

Figure 1 is a sectional view taken on a vertical plane extending centrally and longitudinally through a hydro-carbon engine equipped with a force feed lubricating system embodying our invention, Figure 2 is a sectional view taken on the line 2—2 of Figure 1, looking in the direction indicated by the arrows, Figure 3 is a detail sectional view of the circulating pump of the system, Figure 4 is a view similar to Figure 2, illustrating a slightly modified form of the system, Figure 5 is a detail vertical sectional view of the filtering element forming a part of the system shown in Figure 4, Figure 6 is a detail sectional view taken on the plane indicated by the line 6—6 of Figure 5, Figure 7 is a view similar to Figure 5 illustrating a slightly modified form of the filtering unit, and Figure 8 is a detail sectional view taken on the plane indicated by the line 8—8 of Figure 7.

Figure 9:
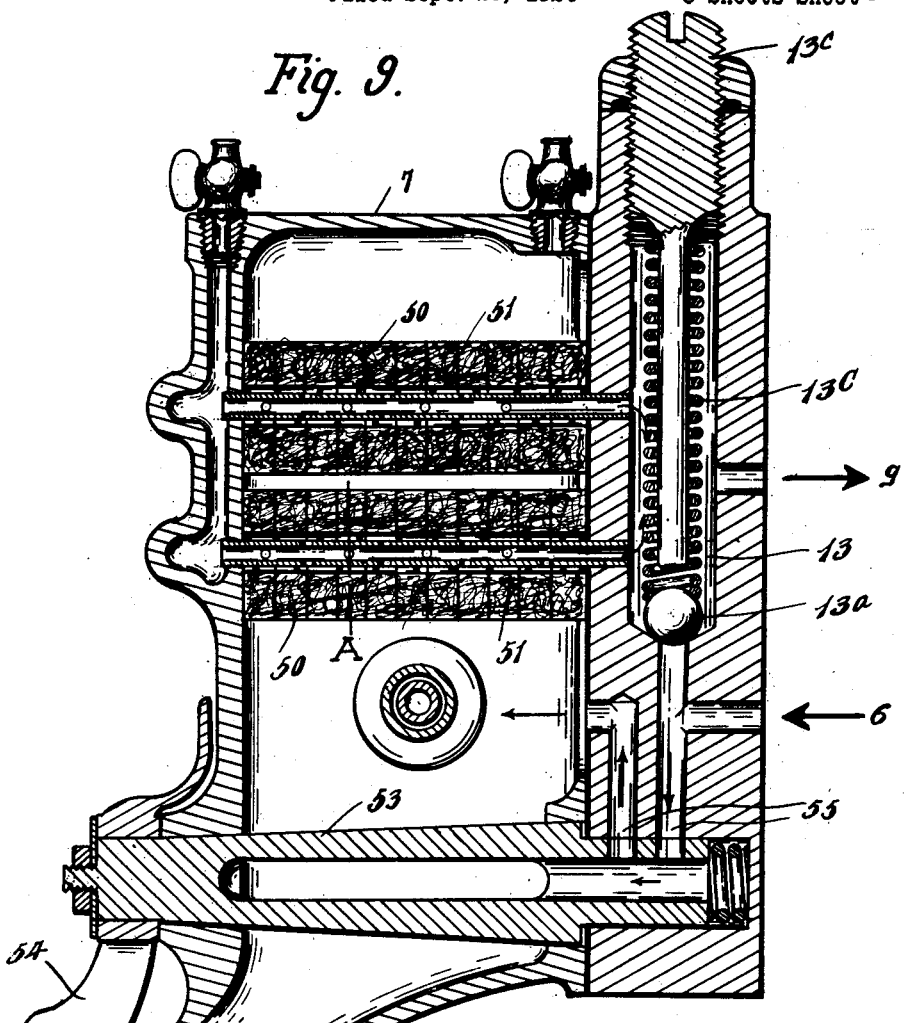
Fig. 9 shows a vertical central sectional view of the form of filter indicated in Figs. 1 and 2.
Figure 10:
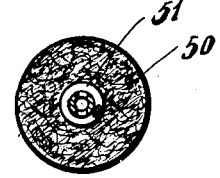
Fig. 10 shows a cross section taken on the line A—A of Fig. 9.

Referring to the drawings by reference characters, 1 designates a hydro-carbon engine equipped with a force feed lubricating system embodying our invention.

The lubricating system comprises a sump 2, a circulating pump 3 which draws oil from the sump 2 and delivers it by way of ducts 4 and 5 to the intake port 6 of a filter 7. A duct 8 delivers the oil from the discharge port 9 of the filter 7 to a duct 10 which in turn delivers it to the distributing duct 11. The oil passes from the distributing duct 11 through ducts 12 to the various parts of the engine to be lubricated in the manner diagrammatically illustrated in the drawings by the heavy dark lines.

From the foregoing description taken in connection with the accompanying drawings, it will be seen that the oil passes through the filter before it reaches any of the parts of the engine to be lubricated and due thereto all foreign matter is removed from the oil before it reaches any of said parts.

The filter 7 may be of any appropriate construction. It is, however, preferred that the filter embody the construction shown and described in our copending application, filed 25th day of September, 1924, and serially numbered 739,962. The filter 7 includes a valve controlled by-pass 13 which is located between and communicates with the filter intake port 6 and discharge port 9. The valve 13$^a$ of the by-pass 13 is held to its seat by a spring 13$^b$, and causes the oil to pass from the duct 5 into the filter 7. If, however, the resistance of the filter 7 to the passage of the oil therethrough increases beyond a predetermined degree, the valve 13$^a$ unseats and permits the oil to pass directly from the duct 5 into the duct 6, from which it is conveyed to the parts to be lubricated by the ducts 10, 11 and 12. The pressure under which the valve 13 will unseat may be regulated and controlled by adjusting the tension of the spring 13$^b$, and any suitable means 13$^c$ may be employed to bring about the desired tension of this spring. Within the filter housing 7 are arranged one or more filtering elements 50, as shown in Fig. 9. These are preferably in cylindrical form and constructed usually of superposed layers of felt or the like in the form of washers or disks closely compacted and compressed. These elements have their exterior surfaces exposed to the oil within the housing of the filter and communicate with the outlet passageway 9 from axially extending bore 51. Thus the oil in passing from the inlet 6 to the outlet 9 must filter through these elements when the valve 13$^a$ is closed. The bottom of the housing has a discharge spout 52, which is controlled by a cylindrical valve 53 preferably manually operated from the exterior by a handle 54.

One end of this valve is formed with ports 55 which cooperate with the inlet passageway 6 so that when the valve 53 is turned to open the discharge spout 52, the normal inlet passageway to the filter housing will be closed and oil can only pass to the discharge passageway 9 through the valve-controlled by-pass 13. In this latter event, the oil is free to flow back through the pores to the filtering elements and thence to the interior of the housing and out through the drain spout, whereby to assist in cleaning the filter elements.

The invention comprehends the employment of any suitable means which will enable the lubricating oil to be brought to the temperature necessary to permit the filter to remove from the oil those constituents, such as lacquer, tar, and the like, that lower its lubricating efficiency. This means may comprise a heating or cooling unit 14 of any appropriate construction. A suitable form of cooler or heater is shown and described in the copending application hereinbefore referred to.

In Figures 4, 5, and 6, a slightly modified form of the filter is shown. The intake port of this filter communicates directly with the sump 2, and the discharge port thereof is connected to the intake port of the circulating pump 3. The oil is drawn through the filter by the pump. The filtered oil is delivered to the parts to be lubricated by a duct 15 which communicates with the discharge port 3$^c$ of the pump 3, and which delivers the filtered oil to a duct 16, which in turn delivers it to the distributing duct 11 from which it is delivered to the parts to be lubricated by the ducts 12. The filter is secured to the under side of the sump 2 by bolts 17, and it comprises a casing 18 having a drain opening 19 closed by a rotatable cock 20. The casing 18 communicates with the sump 2 by way of the valve 20, a passage 21 formed in the casing, and an opening 22 formed in the bottom wall of the sump for the reception of the chambered head 23 of the filter. Filtering elements 24 are supported within the casing 18 from the under side of the head 23 by bolts 25. These bolts are hollow and perforated and communicate with the chamber 23$^a$ of the head 23 to convey thereto all oil passing through the filtering elements 24. A block 26 is suitably secured to the upper side of the head 23 and forms an extension of the casing 3$^a$ of the circulating pump 3, and it is provided with passages 27 and 28 which communicate with each other and with the intake port 3$^b$ of the circulating pump 3 and the chamber 23$^a$, respectively. To establish communication between the passage 28 and the chamber 23$^a$, the upper side of the head 23 is provided with an opening 29. The oil is drawn by the pump 3 from the sump 2 through the opening 22, passage 21 and cock 20 into the casing 18, through the filtering elements 24 into the chamber 23$^a$, and thence into the casing 3$^a$ of the pump 3 by way of the opening 29 and the passages 28 and 27. The filtered oil passing out of the discharge port 3$^c$ of the circulating pump 3 passes through the ducts, 15, 16, and 11 and 12 to the parts of the engine to be lubricated.

In order to permit the pump to draw oil directly from the sump 2, in the event that the resistance of the filter to the passage of oil therethrough increases beyond a predetermined degree, the block 26 is provided with a valve controlled by-pass 30 which communicates at one end with the sump 2 and at its other end with the passages 27 and 28. A ball valve 31 is interposed between the terminals of the passage 30 and is held to its seat 32 by a light spring 33 which is mounted in a bore 34 between the valve 31 and a plug 35. A screen 36 surrounds the intake end of the passage 30. The cock 20 permits the filter to be cleaned without draining the crank case.

In Figures 7 and 8, there is shown a slight modification of the filter shown in Figures 4, 5, and 6. The passages in the block 26$^a$ of this filter are so arranged that the oil is forced through the filter by the pump 3, and to permit of this being done passages 37 and 38 establish comunication between the discharge port 3$^b$ of the pump 3 and the intake passage 21 of the filter. The filtered oil passes out of the chamber 23$^a$ by way of the port 29, a passage 38$^a$ and the ducts 15, 16, 11 and 12 to the parts of the engine to be lubricated. A valve controlled by-pass 39 communicates with the passages 37 and 38 and the passage 38$^a$ in order to permit the oil to be delivered directly from the pump 3 to the parts of the engine to be lubricated in the event that the resistance of the filter to the flow of oil therethrough reaches predetermined degree. The valve 40 of the by-pass 39 is held to its seat by a spring 41. A second valve controlled by-pass 42 communicates with the passage 38$^a$ and the sump 2 to prevent undue pressure in the system. The valve 43 of this by-pass is held to its seat by spring 44. A similar relief or safety valve is shown in Fig. 2 at 4$^a$ and in Fig. 4 at 16$^a$.

The shaft 45 of the circulating pump 3 is driven from the cam shaft 46 of the engine in the manner clearly illustrated in Figure 1. In the forms of the system shown in Figures 1 to 5, the ducts 4 and 16 are provided with valves 47 and 48, respectively, which are adapted to maintain a predetermined pressure in the systems.

It is of considerable importance in the filtering of oil in the lubricating system of an engine or the like where pressure feed is used, to regulate the pressure differences on opposite sides of the filtering element so that the rate of flow or velocity of the oil through the filtering element shall not be so great as to cause clogging or stopping of the pores of the filtering medium by forcing or imbedding solid particles of carbon, metallic dust, etc. therein.

If the pressure difference on opposite sides of the filtering element be maintained relatively small, the filter will operate for a definite time without any impairment of its efficiency. To provide for such regulation and establish a limit of maximum pressure difference on opposite sides of the filtering element, we provide the valves 13$^a$ (Fig. 2); 31 (Fig. 5); and 40 (Fig. 7), in the by-passes 13, 30 and 39, respectively, with means whereby they may be set to open when a predetermined pressure difference exists on opposite sides of the filtering element.

These valves are not intended merely to function as safety or relief valves to prevent rupturing of the filtering element or a failure of the oil supply to the bearings if the filter should become stopped, although they are capable of serving this purpose as an incident to their main purpose.

In order to prevent excessive pressures on the filtering element and also limit the pressure of the oil on the bearings and other parts of the system, we provide a return passage leading from the discharge side of the pump direct to the crank case which return passage is provided with a relief or pressure regulating valve, as shown at 4$^a$, in Fig. 2, 16$^a$, in Fig. 4, and 43, in Fig. 7. This relief or pressure regulating valve limits the maximum pressure in the entire system and prevents rupturing of the pipes or connections, including the filter, in case the pump should be operated at a high speed or in case the condition of the oil should be so heavy as to cause slow feeding of the oil through the filter or bearings.

With such a return passageway from the pump to the crank case, fitted with a relief or pressure regulating valve, it becomes possible to adjust the system so that all of the oil pumped to the bearings will pass through the filter when such a result is desired or, optionally, to set the valve so that some of the oil may be by-passed around the filter. In other words, the valve 40, Fig. 7, may be set so as to have greater resistance than the valve 43 or even locked in closed position with positive means so as to insure that any oil going to the bearings must first pass through the filter. This sort of an adjustment is of great advantage in running in a new engine, for the reason that no unfiltered oil can reach the bearings and all of the abrasive substances, including the metallic dust and particles which are inevitably present in the crank case and cylinders of a new engine, are removed before the oil reaches the parts to be lubricated.

By so filtering all of the oil passing to the bearings and other parts of a new engine, a considerable saving can be effected in the process of manufacture for the reason that most manufacturers of the better grades of engines find it necessary after running in a new engine, to disassemble it for the purpose of cleaning, scraping and refitting the bearings. The bearings, due to the presence of metallic particles and other abrasives in the oil which has been passed through the bearings, become so badly marred and scratched during the time of running in as to require this further attention.

We find, however, that if all of the oil going to the bearings and other parts of the engine, be properly filtered before reaching these parts, the bearings will be in good condition and clean throughout after these test operations or running in, and the expense and time of disassembling the engine can be eliminated.

The adjustment last referred to is, of course, advantageous only in working in a new engine, or until such time as the abrasives and metallic particles on the walls of the crank case and cylinders have been fully washed away. Thereafter the necessity for filtering all of the oil is no longer urgent and in the normal operation of the engine, it is advisable to change the adjustment so that the filter by-pass valve will open at a considerably less pressure than the valve which controls the return passage from the pump to the crank case. Thereby, in the practical operation of the engine, the pressure differences on opposite sides of the filtering element may be kept relatively low to prevent clogging in the filter, as when the engine is speeded up, or heavy oil is being circulated. Likewise if the filter should for any reason become stopped up, the by-pass will function to pass oil so that the oil supply to the bearings shall not fail and cause burning out of the bearings.

Thus, applicants have provided dual means for regulating the pressure on the filter, whereby the operator may compel all of the oil pumped to pass through the filter without at the same time endangering the safety of the system, or may optionally provide for a relatively high pressure throughout the system with a low pressure difference on opposite sides of the filter.

What is claimed is:—

1. In a pressure feed lubricating system for engines and like machines, a reservoir to receive oil from the lubricated parts, pump means for supplying oil under pressure from the reservoir to the parts to be lubricated, a filter interposed in said system, control means for the filter capable of adjustment, whereby all of the oil reaching the parts to be lubricated must pass through the filter or optionally a portion or all of the oil may be by-passed around the filter to the parts to be lubricated, and other means for limiting the pressure on the oil pumped to the parts to be lubricated regardless of the adjustment of the filter control means.

2. In a force feed lubricating system for engines and like machines, an oil reservoir arranged to receive oil escaping from the lubricated parts, a pump to receive oil from the reservoir and deliver it to the parts to be lubricated, a filter included in the system, automatic means to maintain within a predetermined maximum the pressure conditions on opposite sides of the filter element, without interfering with the circulation of oil in the system, automatic means to limit the maximum pressure on the oil supplied to the parts to be lubricated, and means to vary the setting of said pressure limiting means whereby either one may be made to take effect in advance of the other.

3. In a force feed lubricating system for engines and like machines, an oil reservoir arranged to receive oil escaping from the lubricated parts, a pump to deliver oil from the reservoir to the parts to be lubricated, a filter interposed in the system, means automatically responsive to an increase in resistance of the filter to permit oil to pass around the filter and separate means between the pump and the reservoir acting automatically to permit direct return of oil from the pump to the reservoir when the pressure on the discharge side of the pump exceeds a predetermined maximum.

4. In a force feed lubricating system for engines and like machines, an oil reservoir arranged to receive oil escaping from the lubricated parts, a pump to receive oil from the reservoir and deliver it to the parts to be lubricated, a filter included in the system, means automatically responsive to an increase in pressure differences on opposite sides of the filter to by-pass the oil around the filter, and connections whereby oil may be made to flow through the by-pass and thence through the filter in a reverse direction, for cleaning purposes.

5. In a pressure feed lubricating system for engines and like machines, a reservoir to receive oil escaping from the lubricated parts, means for causing circulation of oil from the reservoir to the parts to be lubricated and a filter in said system including a housing and a filtering element through which oil normally passes, pressure operated means for by-passing oil around said filter element, and means for opening the filter housing for cleaning and draining purposes and simultaneously causing the oil to pass around the filter element.

6. In a force feed lubricating system for engines and like machines, an oil reservoir to receive oil escaping from the parts to be lubricated, a circulating pump to receive oil from the reservoir and deliver it to the parts to be lubricated, a filter housing having a filter medium arranged in the path of the oil, a by-pass extending around the filter medium, means normally closing said by-pass but operative to automatically open when the pressure on opposite sides of the filter exceeds a predetermined amount, and a drain cock for said filter housing, said drain cock when open being effective to close the inlet to the filter housing and to cause passage of the oil through the by-pass.

7. In a force feed lubricating system for engines and like machines, an oil reservoir to receive oil from the lubricated parts, means for circulating the oil from the reservoir to the parts to be lubricated, and a filter included in the circulating system, said filter comprising a housing, a horizontal partition therein dividing the housing into two compartments, the lower one forming the inlet and the upper one forming the outlet of said filter housing, and a hollow filtering element supported by said partition and communicating at its exterior with the lower one of said compartments and at its interior with the upper one of said compartments.

8. In a lubricating system for engines and like machines, a reservoir to receive oil from the lubricated parts, means for circulating the oil from the reservoir to the parts to be lubricated, a filter interposed in said system, said filter including a filter housing disposed near the bottom of the reservoir and in thermal contact therewith, having an inlet to receive oil from the lower part of the reservoir, whereby the housing may serve as a sump, and a filtering element arranged in said housing with its outlet near the top thereof.

9. In a lubricating system for engines and like machines, a reservoir to receive oil from the lubricated parts, means for circulating the oil from the reservoir to the parts to be lubricated, a filter interposed in said system, said filter including a filter housing disposed near the bottom of the reservoir and in thermal contact therewith and having an inlet to receive oil from the lower part of the reservoir, whereby the filter housing may serve as a sump, a filtering element arranged in said housing with its outlet near the top thereof, and a sediment or collecting chamber spacing the filtering element from the bottom of the filter housing.

10. In a lubricating system for engines and like machines, a reservoir to receive oil from the lubricated parts, means for circulating oil from the reservoir to the parts to be lubricated, a filter included in the lubricating system and comprising a filter housing disposed near the bottom of the reservoir and having its inlet disposed to receive oil from the lower part of the reservoir whereby the housing may serve as a sump therefor, said housing being formed at its bottom with a sediment chamber, a filtering element disposed in the said housing above the sediment chamber, and means for draining the sediment chamber and simultaneously closing the inlet to the housing, whereby the said filter housing may be cleaned without emptying the contents of the reservoir.

11. In a lubricating system for engines and like machines, an oil reservoir to receive oil from the lubricated parts, a circulating pump, a filter having its inlet side in direct communication with the reservoir and its discharge side in communication with the pump, a by-pass around the filter forming a communication between the reservoir and pump, and suction-operated means in said by-pass automatically effective to permit oil to pass therethrough when the pressure difference on opposite sides of the filter exceeds a predetermined maximum.

12. In a lubricating system for engines and like machines, an oil reservoir to receive oil escaping from the lubricated parts, a pump for circulating the oil, a filter included in the circulating system, said filter having its inlet side in direct communication with the reservoir and its outlet side in communication with the suction side of the pump, means to cause the oil to pass through the filter under pressure not exceeding a predetermined maximum, said means being effetive automatically when said maximum is exceeded to permit the oil to pass around the filter to the pump.

13. In a lubricating system for engines and like machines, a reservoir to receive oil escaping from the lubricated parts, a pump for circulating the oil from the reservoir to the parts to be lubricated, a filter interposed in said system and comprising a housing arranged at the bottom of the reservoir and in thermal contact therewith, with its inlet communicating directly with the lowest part of the reservoir so as to serve as a sump therefor, and a filtering element in the housing having its outlet arranged near the top of the housing and communicating with the pump and its inlet surface exposed to the main body of the housing but spaced above the bottom thereof, whereby impurities settling in the bottom of the filter housing are not drawn through the filtering element.

14. In an internal combustion engine, the combination with the engine bearings and the oil pump, of means for filtering the oil passing from the pump to the bearings, and means for reversing the flow of oil through the filtering means.

15. In an internal combustion engine, the combination with the engine bearings and the oil pump, of means for filtering the oil passing from the pump to the bearings, and means for reversing the flow of oil through the filter while maintaining delivery of oil to the engine bearings.

16. In an internal combustion engine, the combination with the engine bearings and the oil pump, of means for filtering the oil passing from the pump to the bearings, and valve means for reversing the flow of oil through the filter and opening the filter to atmosphere for discharging the waste.

17. In combination with the lubrication system of an internal combustion engine, a filter casing having an inlet port, an outlet port to the engine, and a waste outlet port, and a valve for controlling said ports.

18. Filtering means comprising a casing, filter elements therein, and a valve arranged to control the ports of the filtering means so that the liquid will normally pass through the filter in one direction and so that in another position of the valve the liquid will pass through the filter in the reverse direction and out to the atmosphere.

In testimony whereof we affix our signatures.

CHARLES A. WINSLOW.
ELBERT J. HALL.